United States Patent Office 3,531,495
Patented Sept. 29, 1970

3,531,495
2-TRIFLUOROMETHYLBENZIMIDAZOLES
Dennis Ernest Burton, Ickleton, near Saffron Walden, Alan James Lambie, Kidderminster, Geoffrey Tattersall Newbold, Saffron Walden, Albert Percival, Hauxton, and Michael Barry Purdew, Cambridge, England, assignors to Fisons Pest Control Limited, Harston, England
No Drawing. Continuation of application Ser. No. 496,712, Oct. 15, 1965. This application Nov. 18, 1968, Ser. No. 778,011
Claims priority, application Great Britain, Nov. 5, 1964, 45,093/64
Int. Cl. C07d *49/38*
U.S. Cl. 260—309.2
6 Claims

ABSTRACT OF THE DISCLOSURE

There are disclosed new substituted benzimidazoles of the formula:

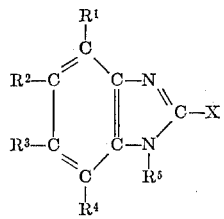

as well as salts thereof wherein the groups $R^1$, $R^2$, $R^3$, $R^4$, $R^5$ and X have the significance indicated in the specification. Also disclosed are physiologically active compositions containing the indicated compounds as active ingredients. Methods are also disclosed for the treatment of plants, materials, soil, land or aquatic areas comprising applying to such substances a physiologically active composition containing the indicated compounds as active ingredient.

---

This application is a continuation of application Ser. No. 496,712, filed Oct. 15, 1965, now abandoned.

The present invention relates to certain substituted benzimidazoles which have been found to possess physiological activity, to their preparation and to agricultural chemical and related compositions containing the same.

It has been found that the substituted benzimidazoles as hereinafter described are active as pesticides in many fields and that certain members are highly active as insecticides, particularly against caterpillars.

Accordingly the present invention is for a physiologically active composition which contains as an active ingredient a substituted benzimidazole of the following formula:

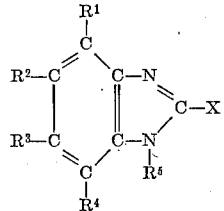

or salts thereof wherein the above formula $R^1$, $R^2$, $R^3$ and $R^4$ may be the same or different and are selected from the group comprising hydrogen, alkyl (for example of 1–6 carbon atoms such as methyl, ethyl or propyl), hydroxy, alkoxy (for example methoxy, ethoxy, or butoxy), nitro, halogen (for example chloro, bromo or fluoro), pseudo-halogen (for example cyano, thiocyano, isothiocyano or azido), substituted alkyl (for example trifluoromethyl, chloromethyl, bromomethyl, trichloromethyl, hydroxymethyl, 2-chloroethyl, 2-hydroxyethyl, or 2-methoxyethyl), carboxy, carboxy ester, carboxy amide, N-substituted carboxy amide, N-disubstituted carboxy amide, amino or mono or di-substituted amino (for example methylamino, dimethylamino, acetylamino, trifluoroacetylamino, benzenesulphonamido, paratoluenesulphonamido, methanesulphonamido), thiol, alkylthiol and oxygenated derivatives thereof (for example —$SOR^6$ or —$SO_2R^6$ where $R^6$ is alkyl), sulphonic acid and esters and amides thereof and substituted amides (for example phenylsulphamyl, ethylsulphamyl, chloroethylsulphamyl) and a heterocyclic ring attached to the benzimidazole system through a nitrogen atom, radicals, where X is trifluoromethyl or pentafluoroethyl, and where $R^5$ is alkyl (for example methyl, ethyl, hexyl, decyl or dodecyl), substituted alkyl (for example chloromethyl or bromoethyl), aryl (for example phenyl or naphthyl) or substituted aryl, (for example tolyl or xylyl).

Examples of the heterocyclic ring include morpholine, piperidine, piperazine, N'-alkylpiperazine and N'-arylpiperazine.

The present invention is also for a physiologically active composition which contains a substituted benzimidazole as identified above and at least one material selected from the group comprising wetting agents, inert diluents and solvents.

The present invention is also for the treatment of plants, materials, the soil, land or aquatic areas, which comprises applying thereon or thereto a pyhsiologically active composition as defined above. The materials treated according to the invention may be any material susceptible to attack by detrimental organisms such as textiles or organic structural materials, for example fabric, paper and wood, and the treatment may be for example for the purposes of insect destruction or insect repelling. Thus, for example the compounds may be used for industrial protective purposes for example the moth proofing of textiles and the treatment of wood to inhibit insect attack. Such treatments may be applied to wood, paper, wool, cotton, linen, jute and the like. In such treatments the compounds are suitably used as a solution, for example in organic solvents, or as a suspension. For the treatment of wood, the compounds may be incorporated into paint or varnish compositions.

The present invention also comprises the new substituted benzimidazoles of the formula:

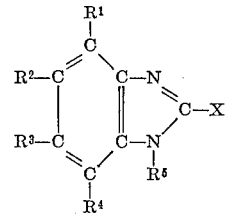

and salts thereof wherein the above formula, the groups $R^1$, $R^2$, $R^3$, $R^4$, $R^5$ and X have the signoficance indicated above.

It has been found that the substituted benzimidazoles according to the invention generally possess physiological activity, viz. as insecticides, herbicides, fungicides etc. Certain of the compounds are especially active as insecticides, especially against caterpillars.

According to a preferred embodiment, the present invention is for compounds of the formula::

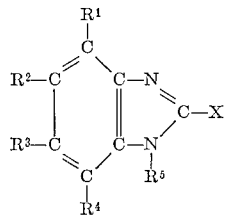

wherein $R^1$, $R^2$, $R^3$, $R^4$ and $R^5$ have the significance indicated above but where at least one of the groups $R^1$, $R^2$, $R^3$ and $R^4$ is chlorine, bromine, iodine, fluorine, nitro, amino, alkyl, trifluoromethyl or a heterocyclic ring suitably also where $R^5$ is a lower alkyl group. According to a further preferred embodiment, three of the groups $R^1$–$R^4$ are chlorine, and the fourth is a heterocyclic ring, for example morpholine. According to another embodiment not more than three of the groups $R^1$–$R^4$ are hydrogen.

Some of the benzimidazoles are also basic and can form salts with strong acids such as hydrochloric acid. Further certain of the lower substituted benzimidazoles can form quaternary ammonium salts.

The substituted benzimidazoles may be prepared by reacting the diamine of the formula:

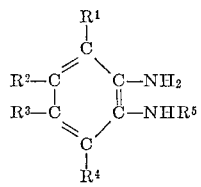

where $R^1$, $R^2$, $R^3$, $R^4$ and $R^5$ have the significance indicated above, with trifluoroacetic acid, trifluoroacetyl chloride, trifluoroacetic anhydride, trifluoroacetamide, pentafluoropropionic acid, pentafluoropropionyl chloride, pentafluoropropionic anhydride or pentafluoropropionamide.

Alternatively the substituted benzimidazoles may be prepared by treating the corresponding substituted benzimidazole which is unsubstituted at the nitrogen (1 position) with an alkylating agent or arylating agent such as an alkyl halide, dimethyl sulphate or diazomethane.

The substituted benzimidazole may be incorporated into physiologically active compositions in any of the usual ways, with or without wetting agents and inert diluents.

If desired the substituted benzimidazoles or salts thereof may be dissolved or dispersed in a water immiscible solvent, such as for example a high boiling hydrocarbon, suitably containing dissolved emulsifying agents so as to act as a self-emulsifiable oil on addition to water.

The substituted benzimidazoles or salts thereof may also be admixed with a wetting agent with or without an inert diluent to form a wettable powder which is soluble or dispersible in water, or may be mixed with the inert diluent to form a solid or powdery product.

Inert diluents with which the substituted benzimidazoles and salts thereof may be incorporated include solid inert media comprising powdered or divided solid materials, for example, clays, sands, talc, mica, fertilizers and the like, such products either comprising dust or larger particle size materials.

The wetting agents used may comprise anionic compounds such as for example soaps, fatty sulphate esters such as dodecyl sodium sulphate, fatty aromatic sulphonates such as alkyl-benzene sulphonates or butyl naphthalene sulphonate, more complex fatty sulphonates such as the amide condensation product of oleic acid and N-methyl taurine or the sodium sulphonate of dioctyl succinate.

The wetting agents may also comprise non-ionic wetting agents such as for example condensation products of fatty acids, fatty alcohols or fatty substituted phenols with ethylene oxide, or fatty esters of sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethyl-ammonium bromide and the like.

The physiologically active compositions according to the present invention may contain in addition to the substituted benzimidazole or salts thereof, other physiologically active materials suc has herbicides, insecticides, fungicides and molluscicides. Insecticidal compositions may contain edible substances attractive to insects such as sugar, molasses and protein hydrolysates, suitably also with specific insect attractants.

The following examples are given to illustrate the present invention; the parts and percentages are by weight unless otherwise indicated.

EXAMPLE 1

A solution of 10 parts of 2,3,4,5-tetrachloro-6-nitro-N-ethylaniline in 80 parts of ethanol was heated to reflux and, with constant stirring, 20 parts of sodium dithionite was washed into the solution with 20 parts of water. Heating was continued for 1½ hours and a further 20 parts of sodium dithionite in 20 parts of water were added. After a further ½ hour reflux, the mixture was concentrated in vacuum, extracted with ether and water washed. Evaporation yielded 6 parts (66% yield) of 3,4,5,6-tetrachloro - N - ethyl-orthophenylenediamine, melting point 37–39° C.

This product (6 parts) was then heated under reflux with 13.1 parts of trifluoroacetic acid for 3½ hours. On cooling, a solid crystalline purple mass was obtained. This was shaken with water. Recrystallisation from ethanol gave 4.6 parts (59% yield) of 1-ethyl-2-trifluoromethyl-4,5,6,7-tetrachlorobenzimidazole as an off-white crystalline solid, melting point 146–148° C.

*Analysis.*—Found (percent): C, 34.25; H, 1.25; Cl, 40.50; F, 16.40; N, 8.10. $C_{10}H_5Cl_4F_3N_2$ requires (percent): C, 34.11; H, 1.43; Cl, 40.30; F, 16.20; N, 7.96.

EXAMPLE 2

Using the method described in Example 1, 2,3,4,5-tetrachloro - 6-nitro-N-butyl-aniline was reduced to 3,4,5,6-tetrachloro - N - butyl-o-phenylenediamine (78% yield) melting point 42–43° C., which was cyclised with trifluoroacetic acid to 1-butyl-2-trifluoromethyl-4,5,6,7-tetrachlorobenzimidazole (59% yield), melting point 83–84° C.

EXAMPLE 3

A solution of 16.2 parts of 2-trifluoromethyl-4,5,6,7-tetrachlorobenzimidazole in 25 parts of 10% aqueous sodium hydroxide was treated, with stirring, with 6.3 parts of dimethyl sulphate. A further 40 parts of water was added to assist stirring and the mixture refluxed for 90 minutes. The reaction mixture was then added to an excess of 10% aqueous sodium hydroxide solution and stirred. The insoluble material was filtered off, washed with water and dried. It was taken recrystallised from ethanol to give 1-methyl-2-trifluoromethyl-4,5,6,7-tetrachlorobenzimidazole (8.8 parts, 52% yield) as a yellow crystalline solid, melting point 214–215° C.

*Analysis.*—Found (percent): C, 32.05; H, 1.00; Cl, 41.85; N, 8.50. $C_9H_3Cl_4F_3N_2$ requires (percent): C, 31.98; H, 0.89; Cl, 41.98; N, 8.29.

EXAMPLE 4

A solution of 15 parts of 4,5,6-trichloro-2-trifluoromethyl benzimidazole in 100 parts of 10% aqueous sodium hydroxide was cooled in an ice-bath and 6.5 parts of dimethyl sulphate added dropwise with stirring over a period of 30 minutes. The mixture was refluxed for 2 hours, cooled and the solid product filtered off and washed with 20% aqueous sodium hydroxide solution and finally with water. After drying it was recrystallised from ethanol to give 1-methyl-2-trifluoromethyl-4,5,6(5,6,7)-trichlorobenzimidazole (3.5 parts), melting point 194–195° C.

*Analysis.*—Found (percent): C, 35.53; H, 1.43; Cl, 35.27. $C_9H_4Cl_3F_3N_2$ requires (percent): C, 35.62; H, 1.33; Cl, 35.04.

EXAMPLE 5

A mixture of 21.5 parts of 6-bromo-4-chloro-2-trifluoromethyl benzimidazole, 115 parts of methyliodide and 6 parts of potassium carbonate were refluxed in 80 parts of dry acetone for 20 hours, cooled, filtered and evaporated in vacuo to leave a solid product. This was washed with 10% sodium hydroxide solution and then with water, dried and recrystallised from methyl alcohol to give 6-bromo-4-chloro-1-methyl-2-trifluoromethylbenzimidazole as off-white crystals, melting point 100–102° C.

*Analysis.*—Found (percent): C, 34.65; H, 1.80; Br, 25.35; Cl, 11.35. $C_9H_5BrClF_3N_2$ requires (percent): C, 34.48; H, 1.61; Br, 25.49; Cl, 11.31.

EXAMPLES 6–31

The following 1-alkyl-2-trifluoromethyl benzimidazoles were prepared by analagous methods to the preceding examples.

1,5-dimethyl-2-trifluoromethyl benzimidazole, M.P. 81° C.
5-bromo-1-methyl-2-trifluoromethyl benzimidazole, M.P. 150° C.
5,6-dichloro-1-methyl-2-trifluoromethyl benzimidazole, M.P. 163° C.
4-bromo-6-chloro-1-methyl-2-trifluoromethyl benzimidazole, M.P. 102° C.
6-bromo-1,5-dimethtyl-2-trifluoromethyl benzimidazole, M.P. 110° C.
1,5-dimethyl-4-nitro-2-trifluoromethyl benzimidazole, M.P. 119° C.
6-chloro-1-methyl-4-nitro-2-trifluoromethyl benzimidazole, M.P. 139° C.
5-bromo-1-methyl-4-nitro-2-trifluoromethyl benzimidazole, M.P. 148° C.
4,5,7-trichloro-1-methyl-2-trifluoromethyl benzimidazole, M.P. 165° C.
5,6-dichloro-1-methyl-4-nitro-2-trifluoromethyl benzimidazole, M.P. 166° C.
4-5-dichloro-1-methyl-6-nitro-2-trifluoromethyl benzimidazole, M.P. 120° C.
4,6,7-trichloro-1,5-dimethyl-2-trifluoromethyl benzimidazole, M.P. 170° C.
4,6,7-trichloro-5-fluoro-1-methyl-2-trifluoromethyl benimidazole, M.P. 180° C.
4-bromo-5,6,7-trichloro-1-methyl-2-trifluoromethyl benzimidazole, M.P. 191° C.
5,6,7-trichloro-4-morpholino-1-methyl-2-trifluoromethyl benzimidazole, M.P. 145° C.
4,5,6-trichloro-1-ethyle-2-trifluoromethyl benzimidazole, M.P. 131° C.
4,5,7-trichloro-1-ethyl-2-trifluoromethyl benzimidazole, M.P. 91° C.
4-bromo-5,6,7-trichloro-1-ethyl-2-trifluoromethyl benzimidazole, M.P. 150° C.
4,5,6-trichloro-1-decyl-2-trifluoromethyl benzimidazole, M.P. 58–60° C.
4,5,6-trichloro-1-hexyl-2-trifluoromethyl benzimidazole, M.P. 63–64° C.
4,5,6-trichloro-1-hexadecyl-2-trifluoromethyl benzimidazole, M.P. 39–41° C.
4,5,6,7-tetrachloro-1-isopropyl-2-trifluoromethyl benzimidazole, M.P. 137–8° C.
4-chloro-1-methyl-7-nitro-2-trifluoromethyl benzimidazole, M.P. 112–114° C.
4,5,6,7-tetrachloro-1-propyl-2-trifluoromethyl benzimidazole, M.P. 114–115° C.
1,5,6-trimethyl-2-trifluoromethyl benzimidazole, M.P. 117–118° C.
4-bromo-1,5-dimethyl-2-trifluoromethyl benzimidazole, M.P. 120–123° C.

EXAMPLE 32

A mixture of 1,5,6-trimethyl-2-trifluoromethyl benzimidazole (13 parts) and methyl iodide (115 parts) were heated together at reflux temperature for 20 hours. The reaction mixture was then cooled and the solid which recrystallised was filtered off and dried to give 1,3,5,6-tetramethyl-2-trifluoromethyl benzimidazolium iodide (9 parts, 41% yield), which after recrystallisation from ethanol has a melting point (with decomposition) of 184° C.

*Analysis.*—Found (percent): C, 39.10; H, 4.00; N, 7.60. $C_{12}H_{14}F_3IN_2$ requires (percent): C, 38.93; H, 3.81; N, 7.57.

EXAMPLE 33

7 centimetre diameter discs of cabbage leaves were painted with 1 millilitre aqueous acetone solutions of each of the compounds identified below at concentrations equivalent to leaf application of 80, 16, 8, 4, and 1 ounces of active ingredient per acre. After drying, each leaf disc was placed in a 9 centimetre diameter petri dish, infected with ten second instar larvae of the cabbage white butterfly *Pieris brassicae* and covered with a glass lid. Three replications were made of each concentration level. After 48 hours the larvae were examined and the number dead were noted. Percentage mortalities are tabulated below.

| Compound | Rate of application, ounces per acre | | | | |
|---|---|---|---|---|---|
| | 80 | 16 | 8 | 4 | 1 |
| 5-bromo-1-methyl-2-trifluoromethyl benzimidazole | 100 | 100 | 25 | 0 | |
| 4,5,7-trichloro-1-methyl-2-tri-fluoromethyl benzimidazole | 100 | 100 | 30 | 0 | |
| 4,5,6,7-tetrachloro-1-methyl-2-trifluoromethyl benzimidazole | 100 | 100 | 100 | 100 | 100 |
| 4,5,6-trichloro-1-ethyl-2-tri-fluoromethyl benzimidazole | 100 | 100 | 100 | 100 | 0 |

EXAMPLE 34

1 inch diameter circular discs of the leaves of French beans *Phaseolus vulgaris* were cut and placed on moist filter papers in experimental chambers designed to prevent the escape of mites. Each leaf disc was then infested with ten adult female mites *Tetranychus telarius* and left for 24 hours. During this period each mite laid approximately ten eggs. The adult mites were then removed and the leaf discs with the eggs were dipped into aqueous acetone solutions of the benzimidazole derivatives indicated below containing 1000, 300, 100, 30 and 10 parts per million (p.p.m.) of active ingredient. The treated leaf discs and eggs were then replaced on the moist filter papers in the chambers and incubated for a period of five days at 20-22° C. At the end of this period the percentage emergence of larvae from the eggs were counted, and is tabulated below:

| Compound | Concentration, p.p.m. | | | | |
|---|---|---|---|---|---|
| | 100 | 300 | 100 | 30 | 10 |
| 5-bromo-1-methyl-2-trifluoro methyl benzimidazole | 0 | 0 | 80 | 100 | |
| 4,5,7-trichloro-1-methyl-2-trifluoromethyl benzimidazole | 0 | 0 | 0 | 0 | 30 |
| 4,5,6-trichloro-1-ethyl-2-trifluoromethyl benzimidazole | 0 | 0 | 0 | 0 | 60 |

EXAMPLE 35

9 centimetre diameter filter papers treated with aqueous acetone solutions of 4,5,7-trichloro-1-methyl-2-trifluoromethyl benzimidazole at rates equivalent to 300, 100, 30 and 10 milligrams per square foot were placed in the bottom of 9 centimetre diameter petri dishes. Batches of adult female houseflies *Musca domestica* lightly anaesthetised with carbon dioxide were then introduced into the dishes and a glass lid placed over each. After 24 hours the flies were examined and it was found that 100% mortality had been obtained at all four concentrations.

What is claimed is:

1. A member selected from the group consisting of a compound of the formula:

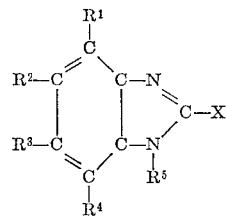

and physiologically active salts thereof wherein X is selected from the group consisting of trifluoromethyl and pentafluoroethyl, $R^1$, $R^2$, $R^3$ and $R^4$ independently are selected from the group consisting of hydrogen, chlorine, bromine, fluorine and nitro, with the proviso that no more than three of $R^1$, $R^2$, $R^3$ and $R^4$ are hydrogen, and $R^5$ is alkyl of 1 to 12 carbon atoms.

2. A compound as in claim 1, said compound being 1-methyl - 4,5,6,7 - tetrachloro-2-trifluoromethylbenzimidazole.

3. A compound as in claim 1, said compound being 1-methyl-4,5,7-trichloro-2-trifluoromethylbenzimidazole.

4. A compound as in claim 1, said compound being 1-methyl-5-bromo-2-trifluoromethylbenzimidazole.

5. A compound as in claim 1, said compound being 1-ethyl-4,5,6-trichloro-2-trifluoromethylbenzimidazole.

6. A compound as in claim 1, said compound being 1-methyl-5-chloro-4-fluoro-2-trifluoromethylbenzimidazole.

References Cited

FOREIGN PATENTS 659,384    8/1965    Belgium.

OTHER REFERENCES

Bishop et al.: Jour. Chem. Soc. (London), 1964, pages 3076-80 (Sept. 1964).

Brooke et al.: Jour Chem. Soc. (London), 1961, pages 802-7.

Lane: Jour. Chem. Soc. (London), 1955, pages 534-9.

Lane et al.: Jour. Chem. Soc. (London), 1956, pages 569-73.

Morgan: Jour. Chem. Soc. (London), 1961, pages 2344-5.

Netherlands application 6410413, 3-1965, 13 pages.

Wright: Chem. Rev., vol. 48, pages 397 relied on (1951).

Fara et al.: Bollettino Dell'Istituto Sieroterapico Milanese, vol. 42, pages 630-7 (1963).

HENRY R. JILES, Primary Examiner

N. TROUSOF, Assistant Examiner

U.S. Cl. X.R.

71—92; 260—247.1, 247.2, 247.7, 268, 575, 576, 577; 424—273